Figure 1:
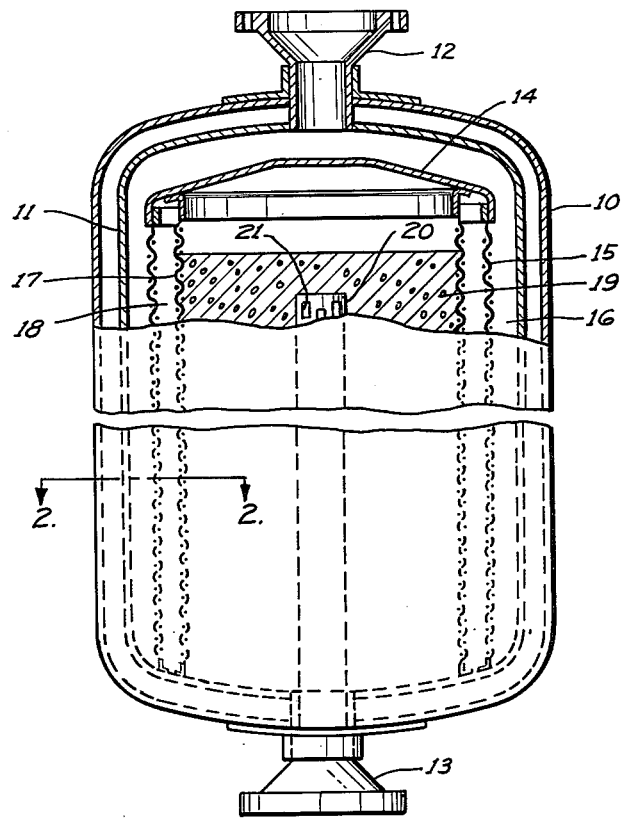

Aug. 28, 1962

W. W. GRIMES 3,051,561

RADIAL FLOW REACTOR

Filed May 14, 1959

INVENTOR.
WILLIAM W. GRIMES
BY
Oberlin, Maky & Donnelly
ATTORNEYS.

United States Patent Office 3,051,561
Patented Aug. 28, 1962

3,051,561
RADIAL FLOW REACTOR
William W. Grimes, Cleveland, Ohio, assignor to The Standard Oil Company, Cleveland, Ohio, a corporation of Ohio
Filed May 14, 1959, Ser. No. 813,199
1 Claim. (Cl. 23—288)

This invention relates to an improved reactor of the type designed for radial flow of the gases and vapors of the reactant stream through a bed of catalyst or other particulate contact material.

In a conventional reactor on this order, the material bed is supported by a vertically disposed, generally cylindrical screen, with a fluid conduit of relatively small diameter extending centrally within the thus-supported bed and the screen spaced inwardly from a surrounding liner wall. This last spacing defines an annular chamber about the screen for vapor flow between the same and the embedded conduit, radially through the catalyst or contact material and generally inwardly since the reactant stream usually enters at the top and is directed to the outer chamber.

It is intended, and efficient operation of the reactor requires, that the vapors and gases of the reactant stream flow radially through the bed uniformly over the full height thereof. However, in an actual installation of such a conventional reactor with which I am familiar the reactor performed so poorly on at least two occasions as to require major shutdowns, and it was found that the peripheral screen had become plugged by accumulations thereon of particulate matter entrained in the feed due to scaling and fouling conditions in the equipment ahead of the reactor. Such plugging of the screen had caused maldistribution of the vapors through the catalyst bed, with poor utilization of the catalyst and the rate of poison removal reduced substantially below the normal level. Moreover, in this particular installation, the system was operated at high temperature and pressure, and also under a high hydrogen partial pressure in the presence of hydrogen sulfide. Such operating conditions or the equivalent, common in installations of this type, make it completely impractical to employ conventional separating equipment, for example a knockout drum or cyclone separator, in the feed line to remove entrained particles and thus protect against plugging of the reactor screen. Any conventional device on this order would have to be of extremely heavy, special alloy construction, and even if a satisfactory unit could be produced, it would be a very costly solution to the problem.

It is accordingly a primary object of the present invention to provide a radial flow reactor which is protected in a practical manner against maldistribution of the flow through the same.

Another object is to accomplish the aforesaid improved result by means of a novel and inexpensive screen assembly within the reactor.

Other objects and advantages of the present invention will become apparent as the following description proceeds.

To the accomplishment of the foregoing and related ends, the invention, then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 2:
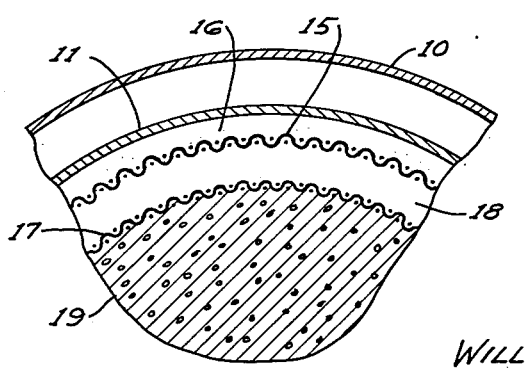

In said annexed drawing:

FIG. 1 is a longitudinal section of a reactor, broken for convenience, constructed in accordance with the present invention; and FIG. 2 is a fragmented transverse section of such reactor as viewed from the plane of the line 2—2 in FIG. 1.

Referring now to the drawing in detail, the illustrated reactor, of radial flow type, comprises a cylindrical and vertically extending outer shell 10 and a correspondingly shaped and arranged inner liner 11 in spaced relation. The void between the two such closed chambers is filled with a suitable refractory insulating material, not shown, as is customary.

A reactant stream inlet 12 is fixed axially in the top of the reactor, leading to the interior of the liner 11, and an outlet 13 is similarly arranged at the bottom, with both adapted for pipe connection thereto. An impact baffle 14 of general inverted-dish form is arranged centrally and horizontally in the upper portion of the liner, with its uppermost surface spaced a predetermined distance below the inlet and its peripheral portion of such reduced diameter as to be spaced inwardly of the cylindrical wall of the liner.

Reference numeral 15 designates an outer generally cylindrical screen which extends from the lower edge of the baffle 14 to the bottom of the liner 11, completely about the latter. Such outer screen is thus spaced from the liner wall to provide an unobstructed first annular space indicated at 16.

A cylindrical inner screen 17 of smaller diameter is arranged coaxially within the outer screen and extends from the underside of the baffle 14 likewise to the liner bottom. The difference in the diameters of the outer and inner screens provides a second annular space 18 of significant width between the two, and such space is likewise free of obstruction.

This inner screen 17 serves to contain and support therewithin the bed 19 of catalyst or other contact material, while a fluid conduit in the form of a pipe 20 having slots or perforations 21 therein extends upwardly from the outlet 13 along the axis of the reactor over a major portion of the vertical extent of the liner. Such conduit is completely surrounded and covered by the bed of the material.

It will accordingly be seen that the feed to the reactor through the top inlet encounters and is deflected laterally by the impact baffle 14 to the first annular space 16 between the liner wall and the outer screen 15. The gases and vapors flow from such space radially inwardly through the outer screen, the second annular space 18 between the outer and inner screens, the inner screen 17 at the periphery of the bed, and then through the bed to the central conduit 20, from which the vapors proceed to the outlet of the reactor. Should the outer screen 15 now become fouled by particle accumulation thereon, the vapors after passing non-uniformly through the same will redistribute in the second annular space 18 over the full height of the catalyst bed, whereby the desired uniform flow pattern therethrough is provided and assured.

Furthermore, by appropriate formation of the outer screen, and provision of convenient access to the interior of the reactor, the outer screen can be made removable for cleaning, without dumping of the catalyst. This last step is of course necessary in the conventional single screen construction if such a screen is to be cleaned.

It will further be apparent the new construction does not add substantially to the cost of the reactor and, in fact, the conventional construction discussed can readily be adapted in accordance with the invention. In such changeover, the usual screen can be employed as either the outer or inner screen as herein described, depending on the particular spatial arrangement desired to accomplish the improved operation set forth.

Other modes of applying the principle of the invention may be employed, change being made as regards the details described, provided the features stated in the following claim or the equivalent of such be employed.

I, therefore, particularly point out and distinctly claim as my invention:

A radial flow catalytic reactor comprising means forming a chamber having a substantially cylindrical side wall, with a central fluid outlet at one end of said chamber, fluid inlet means at the other end of the chamber for supplying gases and vapors under pressure thereto, a perforated discharge conduit extending inwardly from said fluid outlet along the axis of the chamber to the other end portion of the same, a support screen laterally enclosing said conduit in spaced relation and being spaced also from the substantially cylindrical side wall of the chamber, said support screen and the conduit defining a first annular section which is coextensive with the perforated conduit and spaced inwardly from the side wall of the chamber, a bed of particulate catalyst contained by the conduit and support screen in and filling said first annular section between the two, a substantially cylindrical particle-retaining screen in spaced co-extensive relation about the support screen and spaced from the chamber wall, said particle-retaining screen forming a second annular section with the support screen and a third annular section with the chamber wall, said second and third annular sections being unobstructed, means for closing the ends of said second annular section defined by the particle-retaining screen and the support screen, and means for directing the gases and vapors from the chamber inlet means to the outermost third annular section defined by the chamber wall and the particle-retaining screen, the gases and vapors thus supplied to the chamber thereby being caused to flow radially first through the particle-retaining screen for entrapment of solids, and then through the unobstructed second annular section for redistribution therein before encountering the support screen and proceeding through the bed of contact material.

References Cited in the file of this patent

UNITED STATES PATENTS

| | | |
|---|---|---|
| 1,270,042 | Moisant | June 18, 1918 |
| 1,682,787 | Jaegar | Sept. 4, 1928 |
| 2,315,208 | Kinnard | Mar. 30, 1943 |
| 2,363,738 | Mather | Nov. 28, 1944 |
| 2,483,923 | Morrey | Oct. 4, 1949 |
| 2,683,654 | Bergman | July 13, 1954 |
| 2,750,042 | Wilkinson | June 12, 1956 |
| 2,855,103 | Wilkinson | Oct. 7, 1958 |
| 2,943,921 | King | July 5, 1960 |